[United States Patent Office — 2,985,248 — Patented May 23, 1961]

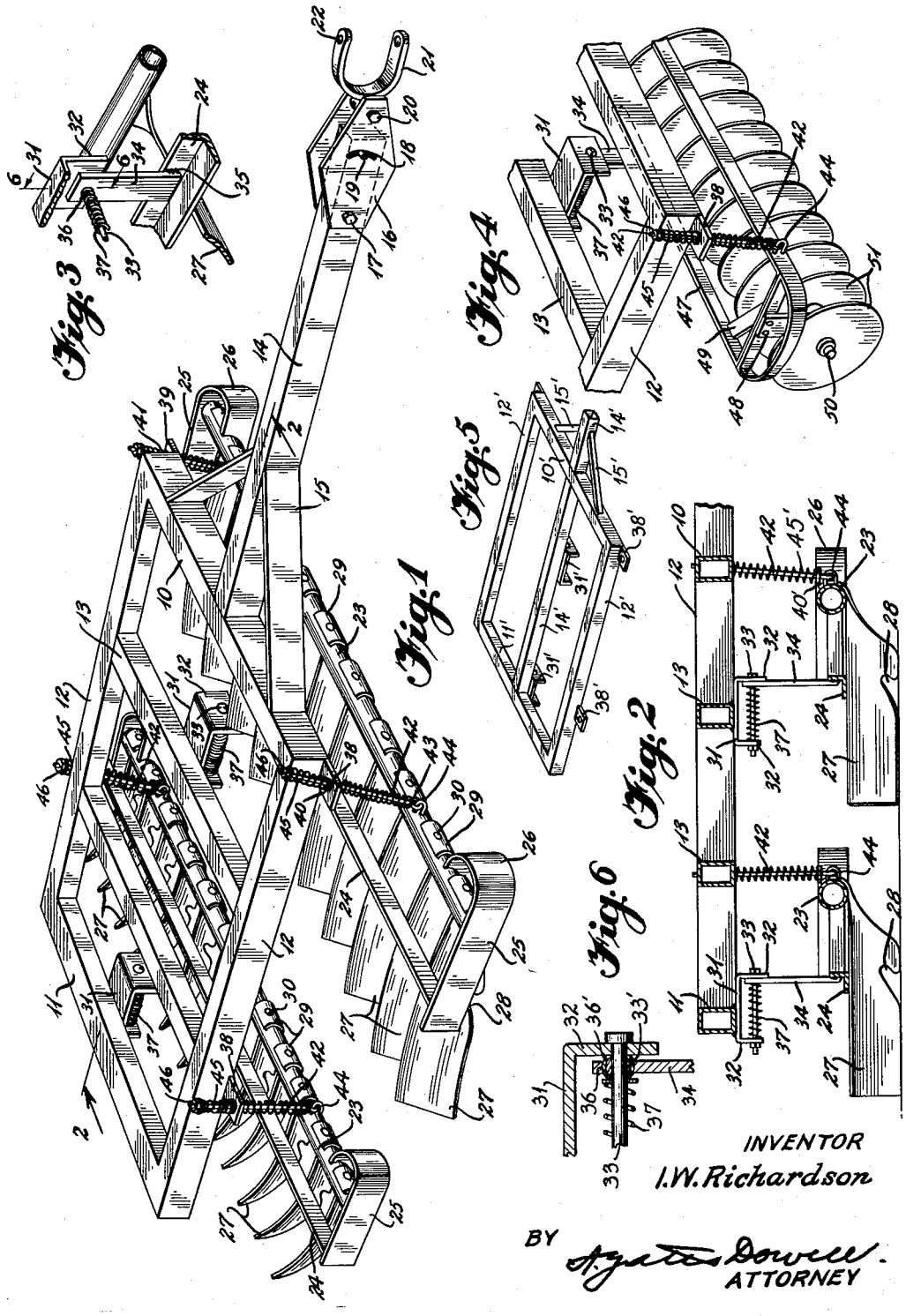

2,985,248
GANG HARROW
Irwin W. Richardson, Lady Lake, Fla.
Filed July 22, 1960, Ser. No. 44,807
6 Claims. (Cl. 172—619)

This invention relates to care and cultivation of the soil and to harrows and other equipment utilized in the performance of the necessary operations in connection with the planting of seed and caring for plants during growth, maturity, and the harvesting of the crop.

The invention relates particularly to harrows or other implements which are attached to tractors or other propelled vehicles and dragged along the earth for preparing and cultivating the soil and which harrows employ a series of earth-engaging members of generally circular or elongated shape or configuration.

Gang harrows have been provided having main frames and auxiliary frames with the latter carrying a series of earth-engaging elements usually of disc or elongated blade type or the like, with such main and auxiliary frames connected more or less rigidly without the necessary freedom of movement of the auxiliary frame carrying the earth-engaging elements with the main frame and which has limited the usefulness of the device.

It is an object of the invention to provide simple and inexpensive improvements in a gang harrow in a manner to enlarge its usefulness and to make more satisfactory its operation by the increase in flexibility thereof.

Another object of the invention is to provide a gang harrow having a main and an auxiliary frame with means for connecting the main frame to a conventional tractor or propelling vehicle and with the auxiliary frame attached to the main frame by a three-point connection with a spring incorporated in each of the three points of connection in a manner to provide a resiliency or yieldability to the auxiliary frame with its earth-engaging element so that such frame and blade may yieldably move during the use of the harrow.

Another object of the invention is to provide a gang harrow in which there is increased yieldability and resiliency between the supporting and earth-engaging structures which will permit greater intimacy between the earth engaging portions and the earth to more closely follow the contour of the terrain, to have greater yieldability when engaging an object, and to provide greater action on the earth including reduction in particle size.

A further object of the invention is to provide an implement attached to and supported by a three point connection to a tractor in a manner to support the implement above the earth, including for transportation purposes, and the lowering of the implement to work slightly above or in contact with the earth.

Other objects and advantages of the invention will be apparent from the following description taken in conjunction with the accompanying drawings, in which:

Fig. 1 is a perspective illustrating one application of the invention;

Fig. 2, a sectional view on the line 2—2 of Fig. 1;

Fig. 3, a fragmentary perspective showing means of suspension;

Fig. 4, a fragmentary perspective of a modified form of the invention,

Fig. 5, a perspective of a modified form of frame for use individually or in multiples; and Fig. 6, a fragmentary detail section on the line 6—6 of Fig. 3.

Briefly stated, the invention is a gang harrow including a main or mounting frame and an auxiliary frame carrying earth-engaging elements the main frame being attached to a conventional tractor by a 3-point oscillating suspension, one connection being a central supporting connection and the others being laterally restraining connections to permit maximum independent side to side rocking movement of the auxiliary frame and relative forward and rearward movement of the main and auxiliary frames and the circular or elongated earth-engaging blades carried thereby thus permitting the auxiliary frame and blades to follow the contour of the terrain and jiggle or vibrate and with a jerky motion increasing the action of the blades on the soil and any objects or plants encountered, the jiggling connections being in the form of a depending arm rotatable and slidable on a vertical shaft against the action of a coiled spring.

With continued reference to the drawing a generally rectangular main or mounting frame is provided having front and rear frame portions 10 and 11 and side frame portions 12 with cross bars or braces 13. To the center of the front member 10 is welded or otherwise attached a tongue or draw bar 14 reinforced by a pair of angle braces 15 to provide a solid connection with the generally rectangular frame.

At the front end the tongue or draw bar is provided with a hitch bracket 16 connected by a pivot bolt 17 to the tongue and with said hitch bracket having slots 18 in which is located a pin 19 carried by the draw bar 14. On the forward end of the hitch bracket 16 is secured by means of a pivot bolt 20 a tractor connecting yoke 21 having openings 22 for receiving a connecting pin or bolt (not shown) by which connection to the tractor is made.

Beneath the main frame are located a pair of underlying auxiliary frames, each auxiliary frame comprising a tubular cross member 23 and an angular cross member 24, such cross members being connected at each of their ends by means of a J-shaped buffer bar 25 welded or otherwise secured thereto and each having a rounded portion 26 disposed forwardly to cause spreading of the soil and deflection when an object is encountered.

Spaced lengthwise of the cross members 23 and 24 are a series of twisted earth working implement or blades 27 having notched portions 28 and with horizontally disposed curved forward portions 29 attached by bolts 30 to the transverse tubular member 23, the members 29 being spaced across the length of the members 23 so that they will be in engagement with the earth along substantially the entire length of said members and corresponding to the width of the harrow and the blades 27 which are attached to one member 23 being twisted oppositely from those attached to the other member 23.

An auxiliary frame is mounted beneath the front part of the main frame and another such auxiliary frame is mounted beneath the rear portion of the main frame. Such mounting is accomplished by means of a 3-point oscillating suspension including a resilient primary pivot connection located centrally of the length of the angle bar 24 and having a stabilizing resilient connection including a generally U-shaped downwardly open bracket or yoke 31 between the ends 32 of which is disposed a rod or bolt 33 on which is received the end of a connecting or mounting link 34 having its lower end secured as by a weld 35 to the cross member 24, the connecting link 34 having an opening 36 adjacent its end in which a ball socket 36' is welded or otherwise secured and within such ball socket is a ball or bearing member 33' attached to the bolt 33.

A coil spring 37 is confined between the member 34 and the remote bracket end 32 permitting the member 34 to move lengthwise of the bolt 33 and also to rotate relative to such bolt.

In order to limit the rocking movement of the auxiliary frame relative to the main frame, the latter is provided with a pair of perforated extensions 38 and 39 having central apertures 40 and 41 through which stabilizer rods 42 extend, each having an eye 43 engaging a staple 44 attached to the tubular cross member 23, a spring 45 being disposed above the member 38 and being confined between such member and a nut 46 threaded on the upper end of the stabilizer rod 42, such nut being adjustable for varying the tension on the spring. For additional resiliency an additional spring 45' may be disposed around each of the stabilizer rods 42 and beneath each of the members 38 between such member and the washer 40' which rests upon the eye 43 of the rod 42. Thus, the two auxiliary frames support the main frame by means of the upright members 34 at the front and rear of the frame.

Instead of elongated earth engaging blades disk blades may be employed in which event the member 34 is connected to a frame 47 to the front portion of which the staples 44 are connected, such frame having depending braces 48 and 49 which engage a shaft 50 on which a series of disks 51 are mounted. In view of the yieldable connection between the main and auxiliary frames the disks 51 will operate somewhat like scalloped disks and regardless of which type of earth engaging members are employed there will be a more pronounced vibration and earth working and consequently improved operation.

Instead of the frame disclosed in Fig. 1 a modified type of frame may be employed as illustrated in Fig. 5, such frame having a tongue 14', with braces 15', front and rear cross members 10' and 11' and side members 12'. This frame also may have perforated lugs or extensions 38' and inverted U-shaped brackets 31' used in the same manner as in the preferred embodiment.

In operation as the harrow is drawn over the earth and vegetation engaged will pass beneath the forward bar 23 and beneath the forward blades 27 and thence beneath the rear bar 23 and the rear blades 27. Any lumps or large particles will be broken by the bar 23 prior to the passage of such bar thereover.

The utilization of two of such connections as illustrated and four of the resilient stabilizing connections in the mounting of the dual sets of gang harrows is such that the latter can reciprocate forwardly and rearwardly, can pivot universally about a single pivot, namely, the bolt 33 and accommodate themselves generally to the nature, character and topography of the terrain for producing the desired results, the yieldability further contributing to the longevity of the harrow.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A gang harrow comprising a main frame, at least one auxiliary frame, earth working implements carried by said auxiliary frame, a resilient pivot connection mounted midway between the lateral extremities of the main and auxiliary frames and connecting the same, said connection including a substantially vertically disposed member on one of said frames and an overlapping member on the other frame, means yieldably connecting said vertically disposed member and said overlapping member and permitting one frame to move a limited amount lengthwise of the other frame, a pair of resilient connections attached to said frame and located one at each side of the resilient pivot connection of a construction normally tending to maintain the auxiliary frame parallel to the main frame, said connections between the main and auxiliary frame providing a three point suspension of said auxiliary frame from said main frame and serving to afford a limited forward and backward movement of the auxiliary frame relative to the main frame and at the same time to allow limited pivotal movement about both a vertical and a horizontal axis whereby the auxiliary frame and implements may have limited forward and rearward movement and the lateral extremities have raising and lowering action permitting said auxiliary frame to twist and turn about a vertical axis.

2. A gang harrow comprising a generally rectangular main frame, a series of auxiliary frames mounted transversely on said frame, earth working implements carried by said auxiliary frames, a resilient pivot connection midway between the lateral extremities of the main and auxiliary frames and connecting the same, said connection including a substantially vertically disposed member on one of said frames and an overlapping member on the other frame, means yieldably connecting said vertically disposed member and said overlapping member and permitting one frame to move a limited amount lengthwise of the other frame, a pair of resilient connections attached to said frame and located one at each side of the resilient pivot connection of a construction normally tending to maintain the auxiliary frames parallel to the main frame, said connections between the main and auxiliary frames providing a three point suspension of said auxiliary frames from said main frame and serving to afford a limited forward and backward movement of the auxiliary frames relative to the main frame and at the same time to allow limited pivotal movement about both a vertical and a horizontal axis whereby the auxiliary frames and implements may have limited forward and rearward movement and the lateral extremities have raising and lowering action permitting said auxiliary frames to twist and turn about a vertical axis, the implements of the auxiliary frames being disposed in a manner that they react in opposition one to the other.

3. A gang harrow comprising a generally rectangular main frame, a centrally disposed forwardly extending draw bar attached to said main frame, multiple transverse auxiliary frames, earth working elements disposed side by side across said auxiliary frames, means yieldably mounting each of said auxiliary frames from said main frame including a primary connection between the main frame and the auxiliary frames midway between the lateral extremities of said main and auxiliary frames including a depending member on the main frame and an upright overlapping member on the auxiliary frame, means yieldably connecting said upright and depending members permitting the auxiliary frame to yieldably move a limited amount lengthwise of the main frame, a pair of resilient connections between said main and auxiliary frames one at each side of said primary connection and equally spaced therefrom, each including a rod pivotally connected to one of the frames and yieldably connected to the other in a manner normally to maintain the auxiliary frame parallel to the main frame but permitting yieldable movement therefrom and limited pivotal action of the auxiliary frame about its primary connection to the main frame.

4. A gang harrow comprising a main frame and multiple auxiliary frames; earth working elements carried by said auxiliary frames; yieldable means mounting said main frame on said auxiliary frames, said means including a yoke having spaced ends and a portion received in said yoke in spaced relation to one end thereof, a bolt extending through said yoke and extending through said received portion in a manner to permit relative rotation therebetween and to permit sliding of said received portion on said bolt, and spring means urging said received portion in one direction on said bolt; a rod connecting the lateral portions of said main and auxiliary frames, and yieldable means on said rod limiting the pivotal action of said yoke relative to said received portion, the mounting of said main frame on said auxiliary frames being such that said auxiliary frames can freely yieldably move relative to said main frame.

5. A gang harrow comprising an elongated main frame, forward and rear transverse auxiliary frames beneath said main frame, central and side connections between said main and auxiliary frames, each of said central connections including a yoke and a cooperating arm member, a bolt extending through said arm and the end portions of said yoke, said arm being in spaced relation to one end portion and spring means confined between said one end portion and said arm and providing a connection by means of which said auxiliary frame can rock on said bolt relative to said main frame and permitting forward and rearward movement therebetween, and spaced yieldable restraining means between said main frame and said auxiliary frames limiting the rocking action.

6. A gang harrow comprising an elongated main frame and multiple auxiliary frames, earth working implements carried by said auxiliary frames, yieldable means mounting said auxiliary frames on said main frame, said yieldable means including cooperating members one having spaced portions, a bolt connecting said spaced portions, a received portion rotatable and slidable on said bolt between said spaced portions, spring means urging said received portion along said bolt in one direction, and yieldable means connecting said main and auxiliary frames and limiting the relative rotation thereof.

References Cited in the file of this patent

UNITED STATES PATENTS

| | | |
|---|---|---|
| 1,007,982 | Sharp | Nov. 7, 1911 |
| 2,905,257 | Pemberton | Sept. 22, 1959 |